Sept. 29, 1953

O. COOKSEY 2,653,536

METHOD AND APPARATUS FOR CONTROL OF
WEBS IN WEB-HANDLING MACHINES

Filed June 27, 1951

INVENTOR.
Otha Cooksey
BY
Arthur H. Robert
ATTORNEY

Sept. 29, 1953     O. COOKSEY     2,653,536
METHOD AND APPARATUS FOR CONTROL OF
WEBS IN WEB-HANDLING MACHINES Filed June 27, 1951     5 Sheets-Sheet 2

INVENTOR.
*Otha Cooksey*
BY
*Arthur F Robert*
ATTORNEY

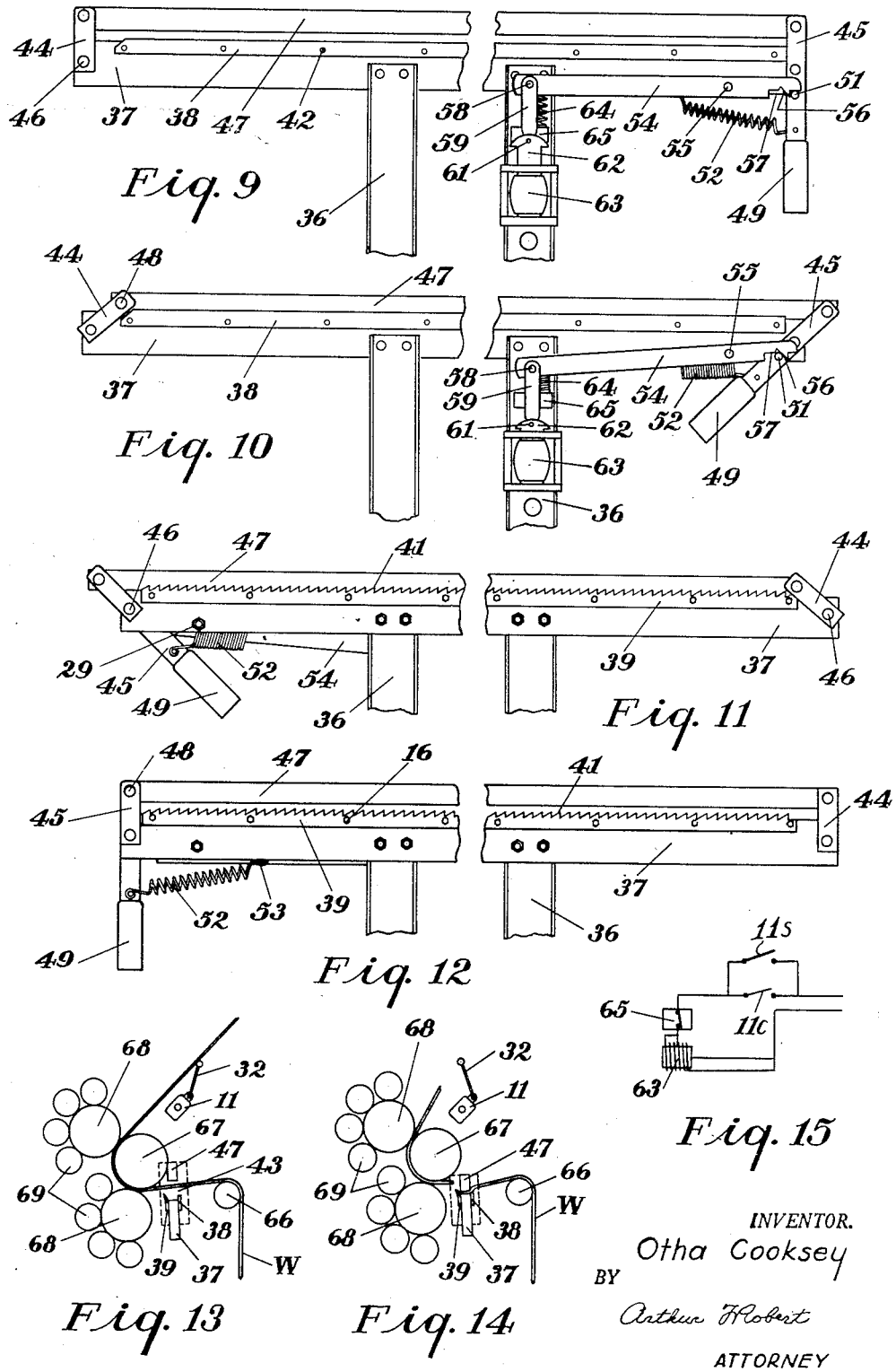

Sept. 29, 1953    O. COOKSEY    2,653,536
METHOD AND APPARATUS FOR CONTROL OF
WEBS IN WEB-HANDLING MACHINES
Filed June 27, 1951    5 Sheets-Sheet 4

INVENTOR.
Otha Cooksey
BY
Arthur H Robert
ATTORNEY

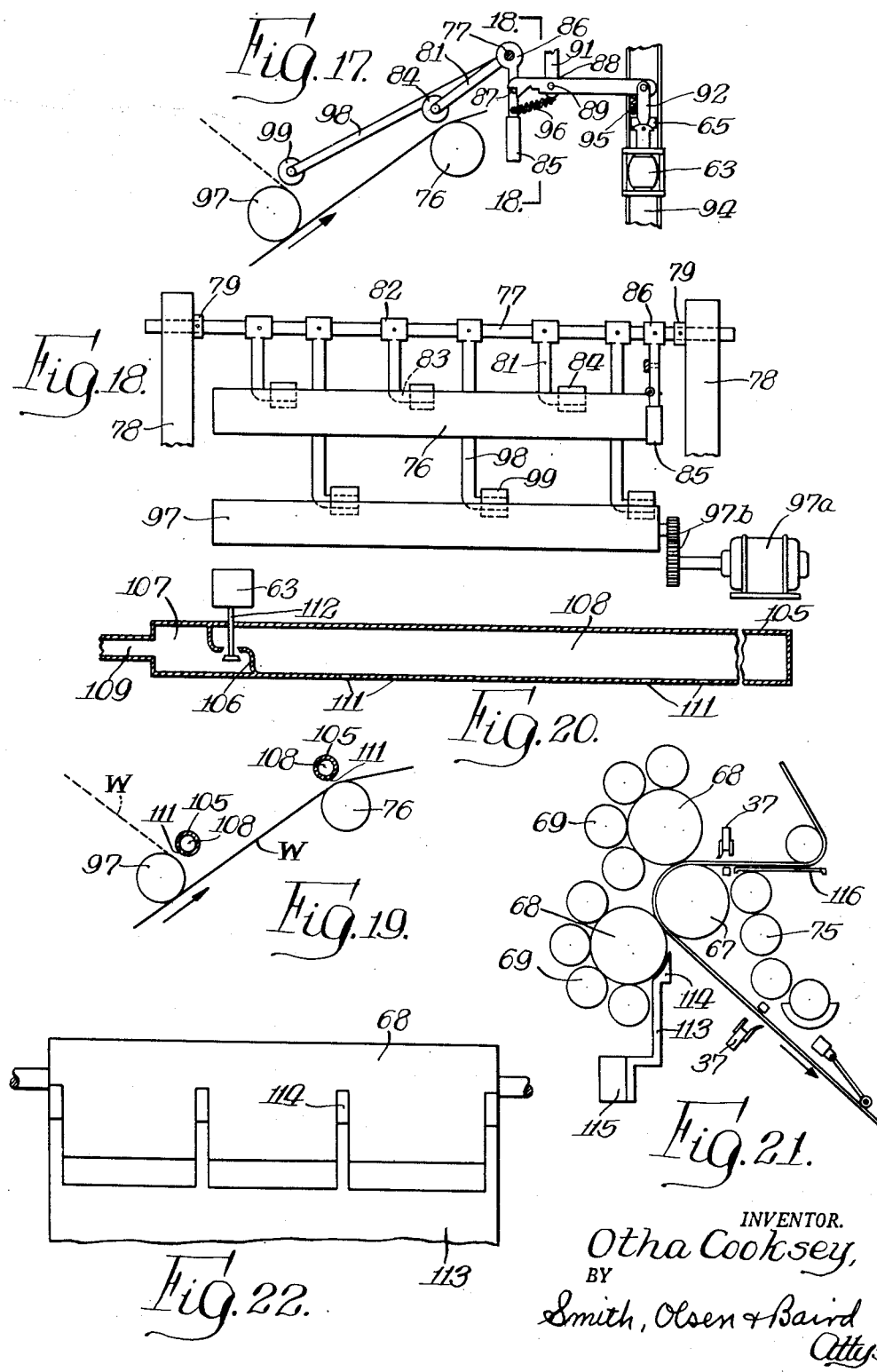

Patented Sept. 29, 1953

2,653,536

UNITED STATES PATENT OFFICE 2,653,536

METHOD AND APPARATUS FOR CONTROL OF WEBS IN WEB-HANDLING MACHINES

Otha Cooksey, Louisville, Ky., assignor, by mesne assignments, to Edwin G. Koriath and Henry F. Thiele, Jr., partners, doing business as Korthe Engineering Company, Schiller Park, Ill.

Application June 27, 1951, Serial No. 233,866

27 Claims. (Cl. 101—180)

The present application is a continuation-in-part of my copending application Serial No. 687,808, filed August 2, 1946, entitled "Method and Apparatus for Control of a Web in a Web-Handling Machine," now abandoned.

The present invention relates to methods and apparatus for controlling a web in a web-handling machine, such as a printing press, and more particularly to control methods and means dependent in part on either partial or complete breaking of the web or upon excessive bulging thereof.

Various types of control means have been proposed heretofore for controlling webs, such as paper webs in printing presses, in the event the web tears or breaks. So far as I am aware, all such prior devices have been concerned with control means riding on the web and operable, when the web tears or breaks, merely to actuate web cutting means. This cutting of the web has been proposed to prevent wrap-up of the web in the cylinder stands with consequent damage thereto. However it has been found that because of the static electricity charge accumulated on the web, the severed web will oftentimes adhere to the rolls and continue to feed and wrap-up on the plate cylinders and packing cylinders as well as on the inking rolls. A wrap-up on any of these cylinders or rolls results in the loss of operating time for the press and considerable labor in repairing the damage and rethreading the web through the press. Efforts have been made to solve this phase of the problem by providing means to set back the plate cylinder from the packing cylinder to allow a space for the paper wrapped up. In some cases this space is sufficient to accommodate the wrap-up, but in others, it is not and damage ensues. In any case, the wrapped web must be removed and the plates cleaned and checked before operation can be resumed. This prior art method does not protect the inking rolls from wrap-up and does not eliminate the labor and time required in cleaning them when wrap-up around them occurs.

When the press is being threaded in prior art machines at a relatively low speed, the circuit including the control means is usually opened, and the web-contacting controls are held out of contact with the web since they serve no useful purpose at that time. No attention has been paid heretofore to the utilization of the controls in this position for a control of the press or web, or to means insuring that the controls are in proper contact with the web before the machine is run at its usual high speed for processing the web. Obviously, if the controls are not in their web contacting positions before the machine is turned to high speed, they are of no value. As the personal element is involved in so moving the controls to the high speed position, it oftentimes happens that they are overlooked, with resultant damage if the web thereafter breaks or tears.

The web-cutting devices of the prior art have left the web free to continue travel and wrap-up under the momentum of the press and by reason of the aforesaid static electricity action. Consequently they have not satisfactorily solved the problem of web control.

In improving over the prior art wherein the objective has been simple severing and accommodation of wrap-up, it is an object of my invention to provide novel methods and means for substantially eliminating wrap-up.

Another object of my invention is the provision of novel methods and means for web control, as in a printing press or the like, wherein the problem of wrap-up with respect to the inking stands is eliminated.

Another object of my invention is the provision of novel means in conjunction with the rolls of a web-handling machine such as a printing press wherein when the web is severed as a result of a complete break, part break, or excessive bulge therein, any severed forward segment left in a roll assembly continues its movement until free of the assembly, means being provided to become effective as a pulling force when the web is severed.

It is another object of my invention to provide novel control means for a machine of the web-handling type wherein proper positioning of the web-contacting controls is assured before the machine can operate at its normal web-processing speed.

A further object of my invention is the provision of novel control means for a machine of the web-handling type wherein the web-contacting controls are utilized as control means in their positions out of contact with the web as when the machine is being threaded as well as in their web-contacting positions.

A further object of my invention is the provision of novel control means for a web in a web handling machine wherein, upon breaking or partial breaking of the web at any one of a number of places, the web is cut and clamped simultaneously at one or more of a plurality of points, whereupon the resulting severed pieces are thereafter spliced and used to rethread the web.

Another object of my invention is the provision of a novel type web switch unit for a web-handling machine that is very sensitive to breaking or partial breaking of the web and is capable of being utilized in contact with and out of contact with the web to control the operation of the machine.

More specific objects of my invention include the provision of novel guard means, novel means for clearing the cut web from the roll stands and related means for preventing wrap-up in the roll stands when the plates might not be damaged but the web may become tangled in the ink stands and the oil wipe stands.

Further objects and advantages of my invention will appear from the following description taken in connection with the accompanying drawings wherein:

Fig. 8 is a similar view showing the switch assemblies employed for actuation of a signal lamp, buzzer or the like;

Fig. 9 is a side elevation of a cutting and clamping assembly of a type which may be embodied with my invention, the assembly being shown in open or web-passing position;

Fig. 10 is a view similar to Fig. 9 showing the assembly in clamping position;

Fig. 11 is a view similar to Fig. 10 showing the opposite side of the assembly;

Fig. 12 is a view similar to Fig. 9 showing the opposite side of the assembly;

Fig. 13 is a partially diagrammatic elevation showing the cutting and clamping bars of the cutting and clamping assembly in web-passing position;

Fig. 14 is a view similar to Fig. 13 with the bars shown in clamping position and the web cut through;

Fig. 15 is a wiring diagram of the assembly units of Figs. 9 to 12;

Figure 16A:
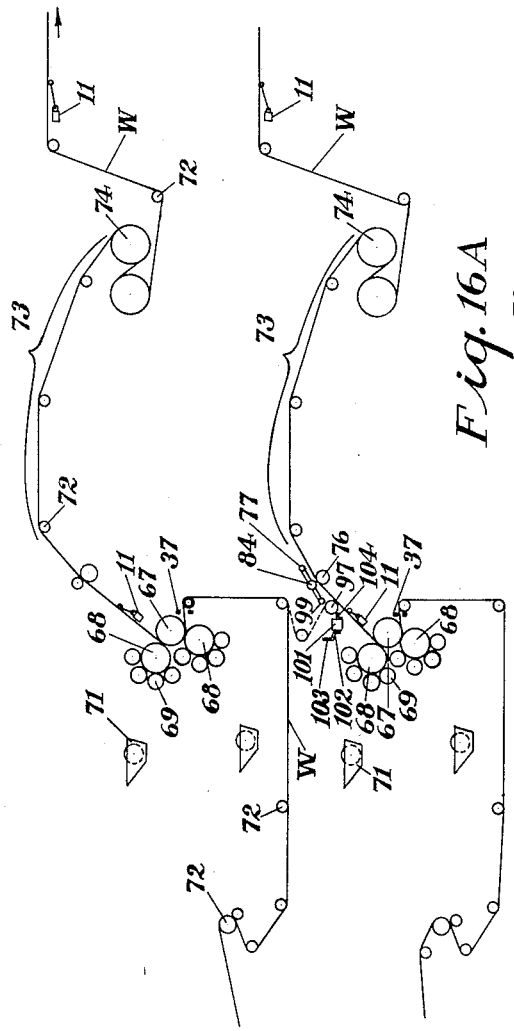
Figure 16B:
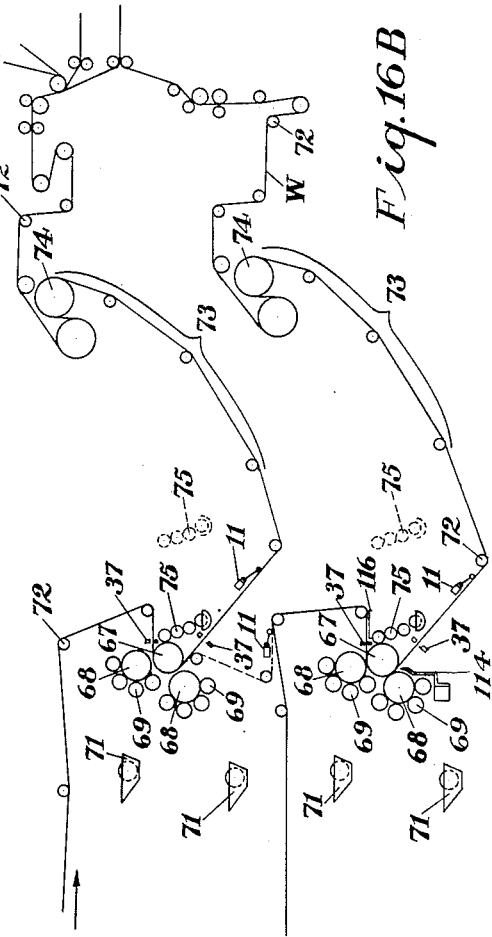

Figs. 16a and 16b constitute a diagrammatic elevation of an application of my invention to a printing press such as a combined two and four color press, Fig. 16a showing the left half of the press, and Fig. 16b, the right half;

Fig. 17 is a diagrammatic elevation of a portion of the press of Fig. 16A for insuring that severed sections of the web are cleared from certain of the roller stands;

Fig. 18 is a section taken on the line 18—18 of Fig. 17;

Fig. 19 is a diagrammatic detailed view, partly in section, of a modification of the device of Fig. 17;

Fig. 20 is a longitudinal section taken on one of the air tubes of Fig. 19;

Fig. 21 is a partially diagrammatic elevation of a portion of the press of Fig. 16B, showing a form of guard for preventing entanglement of the severed web with a roll stand; and Fig. 22 is a front elevation of the guard of Fig. 21 showing its disposition with respect to a plate cylinder.

In the written description which follows, the invention is described, by way of illustration, in connection with a printing press. However, it is to be understood that the invention is applicable to any type of machine wherein a web is processed by printing, coating, or the like, the problems of controlling the web in all such machines being similar. It is also to be understood that the embodiments of the different control elements shown herein are only by way of illustration, and that the invention therein is not to be limited to the exact forms shown.

In its broad aspect, my invention involves methods and means for controlling a web in a web-handling machine in both the threading and processing phases, wherein the proper positioning of all web control means prior to processing is insured and wherein upon parting of the web, as by breaking or tearing, the web is controlled in a manner to prevent wrap-up. More specifically, my invention involves the provision of novel web controlled switches, cutting and clamping devices, pull rolls and guards, singly or in combination, and their novel arrangement in connection with a web-handling machine.

Figure 2:
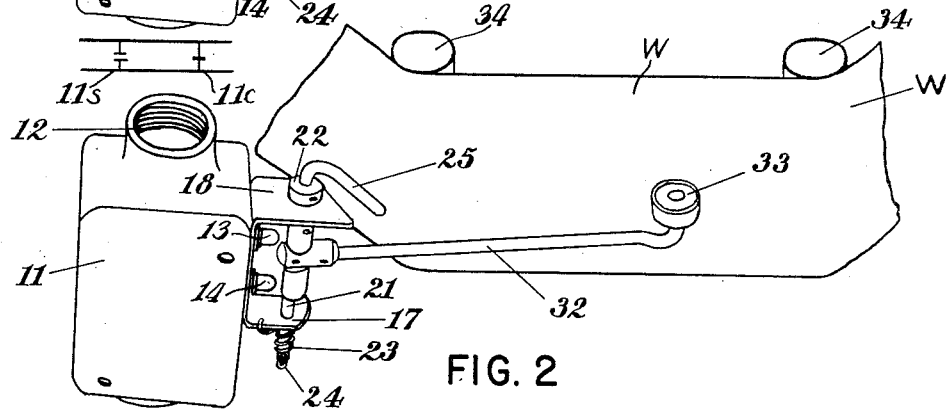
Fig. 2 is a view similar to Fig. 1 showing the control element in contact with the web while the press is operating at high speed or at the normal web-processing speed.
Figure 3:
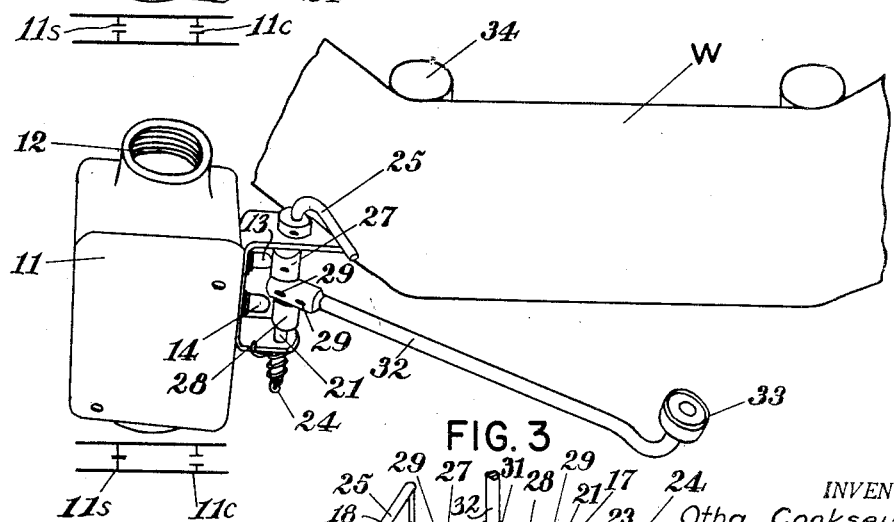
Fig. 3 is a similar view showing the position of the control element when the web is being threaded through the press at a relatively low speed.
Figure 4:
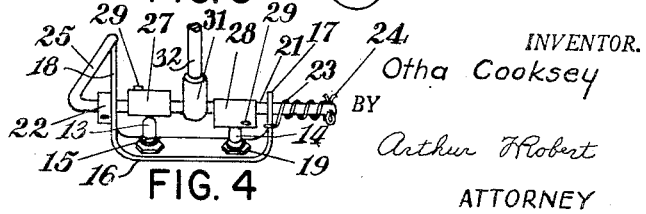
Fig. 4 is a perspective view of part of the control switch assembly showing an extending, upwardly bent end of a supporting shaft in the assembly, the end of the shaft being retained by one leg of a U-shaped supporting bracket, with the positions of the parts corresponding to the positions thereof shown in Fig. 3.

Referring to Figs. 1–4, inclusive, the control switch assembly shown, which is to be considered as only illustrative and not limiting of my invention, comprises a receptacle 11 having tapped end openings 12 and containing two switches 11s and 11c, each switch being arranged to be actuated to and from closed position by switch plungers 13 and 14, extending outwardly from one side of the receptacle. Elements 13 and 14 are arranged to be normally urged outwardly by conventional spring means within the switches in the receptacle. Each of plungers 13 and 14 is arranged to reciprocate in a threaded boss 15 (Fig. 4). A U-shaped support 16 is provided with projecting legs 17 and 18, the legs being suitably apertured and secured over the externally threaded bosses 15 and locked thereon as by nuts 19. A shaft 21 is rotatably mounted in aligned bearing apertures in the legs 17 and 18, the shaft being secured against endwise movement at one end by an adjustable collar 22, secured to the shaft as by a set screw, and at the other end by a coil spring 23 having one end in contact with leg 17 and the other end secured to the right end of the shaft (Fig. 4) by a cotter pin 24 or equivalent means. Thus shaft 21 is yieldably held in the position shown in Fig. 4, it being possible for the shaft to move axially slightly to the left as viewed in Fig. 4 against the action of spring 23. Spring 23 also functions to urge shaft 21 in a counterclockwise direction as viewed in Figs. 1–3, inclusive, so that when the web W breaks or partly breaks, arm 32 will be moved to the position of Fig. 1 past the position of Fig. 2.

The left end of shaft 21 is bent upwardly as shown in Fig. 4 to form an extension 25, the extremity of the extension 25 being arranged to latch upon a projecting end 26 of the leg 18, the purpose of this arrangement being later described. Cams 27 and 28 are mounted on the shaft 21 and are adjustably secured thereon as by screws 29. By loosening the screws 29, the cams can be rotated about the shaft to any relative position thereon desired. An apertured boss 31 is mounted on the shaft 21 between the two cams and is provided with a set screw 29 whereby it also may be rotatably adjusted about the shaft. A feeler or detector arm 32 is mounted in a socket in the end of the boss 31 and is secured therein as by another screw 29 in a manner to extend substantially normal from the axis of the shaft 21, the arm 32 being provided with a right angle bend at its outer end upon which is mounted a free running roller 33.

The assembly is adapted to be mounted closely adjacent a web W supported on rolls 34 of a printing press or like web-handling machine, the parts of the assembly being so arranged that when the arm 32 is in the retracted position shown in Fig. 3, the cam 27 holds the plunger 13 inwardly so that the switch 11s operated thereby is closed as shown in the fragmentary circuit diagram immediately below the receptacle in Fig. 3. In this position, cam 28 is out of contact with switch plunger 14, the switch 11c operated thereby being open. This position of the parts is desired when the press is being operated at a relatively low speed, as when the web is being threaded, and when it is not desired to have rollers 33 in contact with the web. It will be noted in Fig. 3 that by reason of the latching engagement of extension 25 of shaft 21 with extremity 26 of leg 18, arm 32 is held in the position shown against the action of spring 23.

Referring to Fig. 2 which illustrates the control unit in its position when the press is operating at high speed or web-processing speed, roller 33 has been pushed over into contact with the web, extension 25 on shaft 21 being capable of slipping by its latch point 26 by reason of the yielding of spring 23. In the position shown in Fig. 2, the cams are out of contact with their corresponding switch operating plungers, the two switches 11s and 11c being open as shown in the diagram immediately below the receptacle in Fig. 2. Spring 23 functions in this position to urge the roller 33 against the web with considerable force.

Figure 1:
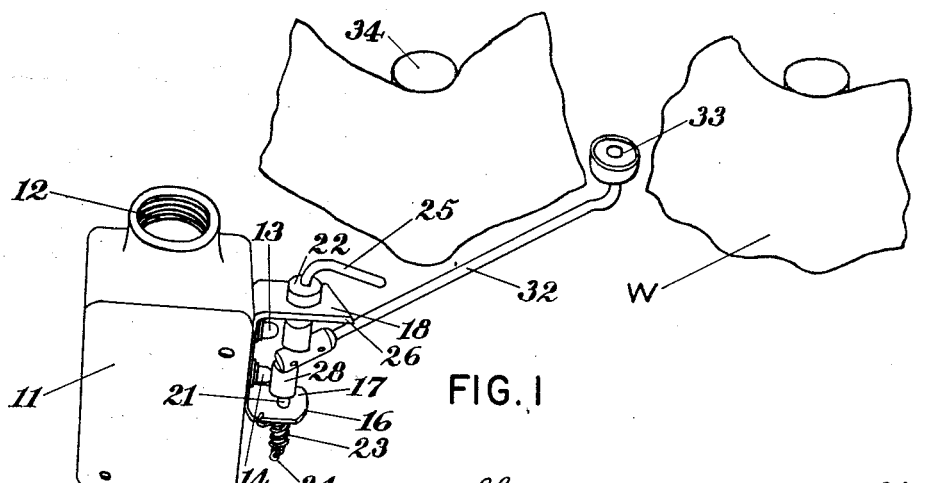
Fig. 1 is a perspective view of a preferred embodiment of the web control switch assembly of my invention, showing the position assumed by its control element when the web is broken.

Fig. 1 illustrates the actuating position of the control switch assembly when the web has become partly or completely broken, or has developed excessive slack therein. In this position, because of the occurrence of the defect in the web, arm 32 has moved across the normal path of travel of the web as shown in Fig. 2, this movement being effected by the action of spring 23. Cam 28 has thus been rotated to a position wherein it actuates the switch plunger 14 to close the corresponding switch 11c as shown in the diagram below the receptacle in Fig. 1, the switch 11s corresponding to the plunger 13 remaining open.

It will be noted that, by reason of the possible relative adjustments of the cams and control arm 32 about shaft 21, the cams can be adjusted to operate the two switch elements in any desired manner relative to the position of the control arm.

Figure 5:
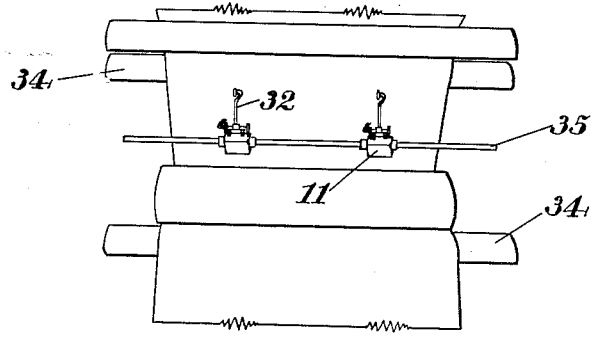
Fig. 5 is a view showing the manner in which a plurality of the control switch assemblies are mounted on a press in operative position with respect to a web.

When the switch assemblies are in operative position on a press, one or more receptacles 11 are preferably threaded on hollow rods 35 closely adjacent the web W (Fig. 5), the roller 33 of each arm 32 of the assemblies being preferably in contact with the dry side of the web, reference being made to a printing press, although it is to be understood that they may be placed in contact with the wet side. Because the rods 35 are hollow, the wiring to the switches can be threaded therethrough from the open ends of the rods.

Referring to Figs. 9 to 12, inclusive, which illustrate a preferred embodiment of my severing and clamping means for the web, the assembly includes suitable supports such as channels 36, a fixed base bar 37 mounted on the supports, a strap 38 having a smooth upper edge and a strap 39 having a serrated upper edge 41, preferably formed in section as shown in Figs. 13 and 14, the two straps being secured to base bar 37 along opposite sides thereof by bolts 42 or equivalent means and positioned to extend upwardly beyond the upper surface of the base bar to form a channel 43 therewith as shown in Fig. 13.

Paired links 44 and 45 are pivoted at opposite ends of the base bar at 46 to pivotally support a moving bar 47 which is attached by pivotal connections 48 to the links, the link 45 extending downwardly to terminate in a handle 49. Link 45 is also provided with a latch pin 51 and the link is connected adjacent the handle to one end of a tension spring 52, the other end of the spring being connected to the bottom face of the base bar at 53.

A latch lever 54 is pivoted on the base bar 37 at 55 and formed with a latch lug 56 and a notch 57 arranged to engage the latch pin 51 in its different positions. Lever 54 is pivotally connected at 58 to a link 59 which is connected, in turn, by a pin 61 to the reciprocating core 62 of a solenoid 63 mounted on one of the supports. A compression spring 64 is mounted on a micro-switch 65 in a manner such that the switch, which is of conventional type, is moved to open-circuit position by opening movement of the latch lever and compression of the spring.

Solenoid 63 is electrically arranged in series with the micro-switch 65 and web controlled switches 11c responsive to breaking or part breaking of the web through the web-contacting arm 32, the latter being arranged to operate control switch 11c when the tension of the web W fails as by breaking or part breaking as shown in Fig. 14.

In setting the device of Figs. 9 to 12 for operation, hand lever 49 is moved to the position shown in Figs. 9 and 12, thereby storing considerable power in the spring 52, the hand lever 49 being retained in this position by the latch lug 56 which engages the latch pin 51 under the action of the spring 64. At this time, the bar 47 is raised above the base bar and its side members a sufficient distance to define a slot through which the web may pass. Micro-switch 65 is closed, the switches 11c and 11s are open by reason of the web being under tension. The arrangement of the parts is illustrated in Fig. 13, a web supporting roller being shown at 66, a packing cylinder at 67, plate cylinders at 68, and inking rollers at 69.

When the web tears or partly breaks as in Fig. 14, the web follower arm 32 closes switch 11c which energizes the solenoid 63 to pivot the latch lever 54 in a counterclockwise direction and release the pin 51. Spring 52 then becomes effective to snap the bars to the closed position of Figs. 10, 11 and 14. In this action the receding edge of the web is cut by the serrations 41 on the base bar 37 and the approaching edge of the web is clamped between the bars in the channel 43 as shown in Fig. 14. Micro-switch 65 is immediately responsive to the movement of the lever 54 and is opened, thereby opening the circuit to the solenoid 63 and deenergizing the latter. Obviously the micro-switch may be placed at other positions on the assembly and function in an identical manner. Because of its deenergization immediately upon release of the latch, it is necessary that the solenoid be energized for only a fraction of a second, thereby increasing its life. An additional advantage is that a small capacity solenoid may be used which can be heavily overloaded during its very brief period of operation without fear of damage. The solenoid can thus be used for more work than that for which it may have been designed. It will also be noted from Figs. 13 and 14 that the entire assembly on one side of and immediately adjacent the web consists of only the movable cutter bar 47 which is relatively small. Consequently, the assembly can be positioned very close to one or both of the cylinders of a press unit, as close as three inches to the packing cylinder where a plurality of plate cylinders are used, thus preventing wrap-up which may follow cutting too far away from the cylinders. By the packing cylinder, I mean the cylinder oppositely disposed to one or more plate cylinders to insure the web receiving the proper pressure against the plate cylinders.

In high speed presses, wherein the web may travel as fast as 30 feet per second, it is essential that the severing and clamping be accomplished in a fraction of a second. Otherwise a wrap-up of as much as 30 feet of web may be sufficient to damage or break the plates. My assembly has proven itself capable of almost instantaneous operation in such presses and has eliminated wrap-up and any damage resulting therefrom.

In Figs. 16a and 16b, I have illustrated a typical press and the manner in which my web control devices are employed therein. The press shown is of the conventional four-color type wherein two webs may be run in two colors or a single web in four colors, the path of the web in four color printing being additionally shown in broken lines, it being understood that the white web feed in four color printing is only to the first lower stand in Fig. 16A and not to the first upper stand.

In Figs. 16a and 16b, the web is indicated at W, the packing cylinders at 67, the plate cylinders at 68 and the ink stands at 69, each of the latter being connected to ink fountains 71 in conventional manner by ink rollers (not shown). Web guide rollers 72 are interposed throughout the press in the usual manner, dryers 73, followed by cooling cylinders 74, are provided with each stand, the printed web being finally fed from the right end of the press (Fig. 16B) to a folding machine. Oil wipe stands 75 are provided where necessary, the stands being shiftable from the positions shown in full lines to the positions shown in dotted lines.

In a press of this type, I preferably dispose control switch members 11 and the combined clamping and severing devices designated at 37, at the positions illustrated. Considering the operation of the press as a two-color press with separate webs passing through the upper and lower sections, a control switch member 11 is positioned adjacent the discharge end of the first printing unit, after the first dryer, and after the second printing unit. Clamping and severing devices are placed closely adjacent the entrance to the first printing unit and on both sides of the packing cylinder in the second unit. The printing units and dryer units exemplify web processing stations.

Referring (Fig. 16A) to the lower section of the press, which in this case practically duplicates the upper section, and assuming that the web has parted to actuate a control switch and that all the clamping and severing devices have been actuated to sever and clamp the web at the places they are located, it will be noted that the web arranged to enter the first printing unit is held against entry and wrap-up within the unit, any over-run in the web being collected in the space to the right of the unit. To insure that the preceding section, commonly called the "tail," of the severed web is cleared from the unit or roll stand, I make use of a web guide roller (Figs. 17 and 18) disposed at the outlet side of the stand. The roller may be a free running idler roller, as in the case of the roller 76 shown in Figs. 17 and 18, or the roller may be a driven roller as in the case of the roller 97 shown in the same drawings. When an idler roller is employed, the roller is normally driven by the movement of the web thereover, the roller being of such weight that it will continue to rotate after the press power is shut off. On the other hand, when a driven roller is employed, such as the roller 97, the roller is driven always at web or press speed by means of an auxiliary drive motor 97a through a gear train 97b, or the roller may be geared to or otherwise driven by the normal press drive. I mount a shaft 77 in supports 78 on the press outside roll 76, the shaft being mounted in suitable bearings to rotate, and being adjustable longitudinally by collars 79. Shaft 77 has a plurality of arms 81 mounted thereon by apertured bosses 82 and secured against rotation as by set screws, keys or similar means. Each of the arms 81 carries a shaft 83 at its extending end to support a roller 84. A handle 85 is secured by boss 86 to shaft 77 to rotate therewith so that the handle can be used to rotate the shaft 77 and swing the rollers 84 in a circular path about the shaft.

Handle 85 has a latch pin 87 mounted thereon to engage a latch arm 88 pivoted at 89 to a suitable support 91 and connected by a link 92 to the movable core of a solenoid 93 mounted on a press frame element 94. A micro-switch 95 is mounted on the press frame in a manner to be opened by the link 92 on its downward movement in the same manner as the switch 65 of Fig. 9. A spring 95 is mounted to return the latch lever to latching position and a spring 96 is provided between the handle 85 and the support 91 to move the handle 85 and the shaft 77 counterclockwise (as viewed in Fig. 17) when the latch is released, this action being aided by the weight of the rollers 84 and the arms 81. Obviously, the latching and operating mechanism is generally the same as that employed in the device of Figs. 9 to 12, inclusive, and it operates in a similar manner.

In its normal position, the handle 85 is latched as shown in Fig. 17 with the rollers 84 clear of the web on the idler roller 76. Solenoid 63 is arranged to be operated simultaneously with the cutter solenoids 63 on any parting of the web and when operated, releases the handle 85 which rotates the shaft 77 by reason of the spring 96 and the weight of the rollers, and brings the rollers 84 into contact with the web on roller 76. Because the roller 76 is spinning freely and has a considerable store of kinetic energy therein, the increased friction between the web and roller 76 caused by the pressure of roller 84 enables the roller 76 to grip the web and continue the movement thereof through the printing stand. Thus the severed web or "tail" section continues in its normal path outside the processing unit and there is no opportunity for any wrap-up of the web in the unit. The same result is achieved when a driven roller, such as the roller 97, is substituted for the idler roller 76.

When the press is being operated as a four-color unit, the web follows the broken line over the first roll stand or impression unit (Fig. 16A) and partially around the driven roller 97, as shown in Fig. 17. To insure clearance of the web from the first impression unit in this path, I provide arms 98 on the shaft 77, carrying rollers 99, the latter being arranged to press the severed web against the guide roller 97 and assure its removal from the unit. Rollers 99 are operated from the same shaft 77 as rollers 84 and function in the same way. In this arrangement the roller 97 may be a driven roller as illustrated, or it may be a free running idler roller such as the roller 76.

To further insure against wrap-up in the first processing station when the severed edge of the web is released from contact with or has passed over the roller 97, I provide a cross member 101 extending across the press and carrying a bracket 102 of the shape shown in Fig. 16A with a plurality of substantially vertical arms 103 and a forked bracket 104 extending substantially horizontally toward the underside of the roller 97. Thus as the severed web passes from the roller 97, any tendency of the web to whip or fall in a manner leading into the lower unit is prevented, brackets 103 and 104 operating to halt any such downward movement.

In Figs. 19 and 20, I have shown a modification of the device of Figs. 17 and 18 for urging the web passing thereover into driving contact with the guide rollers 76 and 97 An air tube 105 is positioned adjacent each of the rollers opposite a point of contact of the web therewith, the tubes being fixed at a point slightly spaced from the web. Each tube is divided by a valve seat partition 106, into an air inlet section 107 and a discharge section 108. The former has an opening 109 for the entrance of compressed air and the latter has a series of spaced apertures 111 for the discharge of the air against the web. A quick opening valve 112 is provided in the valve partition and arranged to be operated by a solenoid 63. The solenoid is connected into the circuit with the controls and other solenoids 63 so that the valve is opened to release compressed air in section 108 and discharge the air as a series of jets through apertures 111 when the web parts or breaks. The jets of air are of sufficient force to force the web into firm contact with the roller 76 or 97, thereby insuring that the severed web will be carried clear of the first printing unit by the action of one or the other of these rollers.

Returning to Figs. 16a and 16b and the lower section of the press, a control switch member 11 is mounted after the first dryer and after the second printing unit, cutting and clamping devices 37 being mounted closely adjacent each side of the packing roller in the second printing unit. Thus the web is severed and clamped prior to entering the unit and immediately after leaving the unit. The section of the web so separated is obviously short and passes from between the cylinders before they cease to rotate. To insure against this web section entangling in the ink stand feeding the lower plate cylinder, I prefer to use a bracket 113 (Figs. 21 and 22) having forks 114 thereon and supported on a cross member 115 of the press. Forks 114 are shaped to be placed in a position closely adjacent the periphery of the lower plate cylinder as shown in Fig. 21. Thus the tail end of the web section cut by the two cutters falls harmlessly down between the forward cutter and the bracket and is prevented from entering the ink stand.

To insure against the web clamped by the first cutter from becoming entangled in the adjacent oil wipe stand, I preferably provide a plate 116 of generally channel-shaped cross-section, across the press and just above the top roller of the oil wipe stand. This plate functions to prevent the web entangling with the oil wipe stand and causes it to fold in a position to the right of the stand.

The upper section of the press is arranged to operate in a like manner when the press is operated as a two-color press. When operated as a four-color press, web W deviates from the two-color path as shown by the broken lines. The control elements are the same and function in substantially the same manner except that in the web path connecting the second upper and lower units, I provide an additional control switch member 11.

Figure 6:
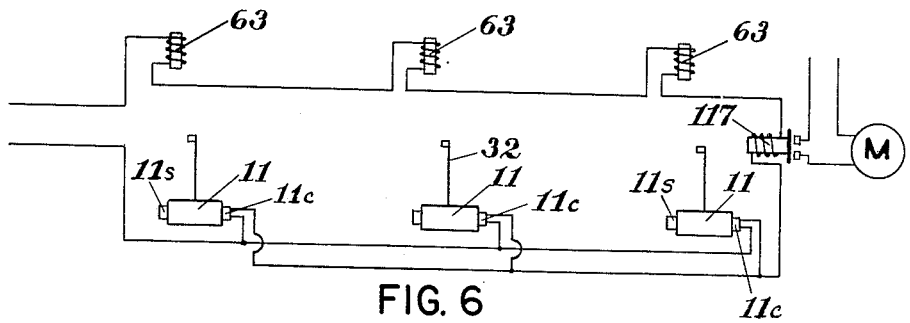
Fig. 6 is a schematic view of a wiring diagram showing a plurality of the control switch assemblies in combination with solenoids suitable for operating web cutting and clamping units such as those shown in Figs. 9 to 12, and for operating the web control mechanism illustrated in Figs. 17 to 20.

The control switches and the solenoids operating the cutters and either the mechanisms of Fig. 17 or Fig. 19 are preferably connected as shown in Fig. 6 so that a part break or break in the web at any one point will operate all the devices simultaneously. I have found that for practical purposes this is the best arrangement since by immediately cutting and clamping the web at these points, there is no possibility of wrap-up and damage to the plates, and the severed web segments may be subsequently spliced and employed to pull the web through the press, thus saving the expense of one length of web which in ordinary practice is wasted each time a press is threaded. I have found that, with such an arrangement, there is no need for checking the plates, cleaning them or the rolls, and taking any action beyond a slight amount of untangling, splicing and rethreading of the web. An alternate arrangement of the circuits for operating the cutters and the mechanisms of Fig. 17 or 19 may also be employed to advantage, particularly when a driven web guide roll, such as the roller 97, is used rather than the idler roller 76. In this alternate arrangement, the circuit is arranged so that, upon the occurrence of a break in the web in the after part of the press, all of the cutters, except that cutter associated with the first roll stand, are operated to sever and clamp the web as described above. The small rollers 99 are dropped down onto the web at the area of its contact with the driven roller 97 and due to the fact that the roller 97 is driven at the same speed as the press, the web in the first roll stand will be maintained at its normal tension as the press is brought to a halt, the action of the roller 97 serving at the same time to prevent the web from becoming entangled in the first roll stand. This alternate arrangement makes it unnecessary to splice or rethread the web through the first roll stand following the occurrence of a break in the web in the after part of the press, thus saving more time in the rethreading operation than would otherwise be the case. This same principle may of course be applied in other parts of the press where driven web-guide rollers are available or may be installed.

If desired, a relay 117 in the main drive circuit for the press can be placed in the switch circuit of Fig. 6 and employed to open the main circuit to halt the press when the web breaks or tears. Such presses ordinarily are built with a brake which acts to halt the press upon opening of the main drive circuit.

Figure 7:
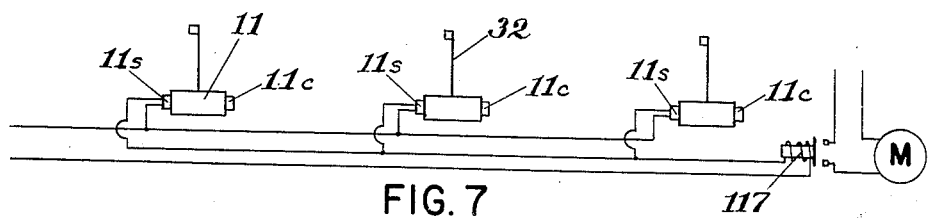
Fig. 7 is another schematic view of a wiring diagram showing the control switch assemblies in a circuit for controlling the closing of the high speed operating circuit of the press.

In Fig. 7, I have shown a manner in which the controls through the switch members 11 are utilized to insure that the press is not turned on to the high speed except when all the controls are in their proper web-contacting positions. A relay 117 is positioned in the circuit to the high speed drive M (electric motor or control therefor) for the press and connected in a manner so that as long as any one of the control assemblies is in the position shown in Fig. 3 and a switch 11s is closed, the relay will be held in a position holding the circuit to the drive M open. Consequently, relay 117 will not be released until all the control elements are moved to the position of Fig. 2 whereby the switch 11s of each element will be opened, thus permitting relay 117 to move to a position closing the circuit to the motor M.

Figure 8:
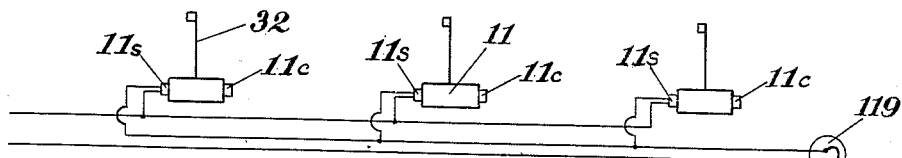

In Fig. 8, I have shown an arrangement whereby a signal lamp 119 on the control board for the printing press or like machine is maintained lighted by switches 11s when the controls are in the positions shown in Fig. 3, the lamp remaining lighted and serving as a warning signal not to turn the press on to the high speed until all the controls are moved to the position shown in Fig. 2, thus opening the switches 11s and extinguishing the light. Obviously, a buzzer or any other type signaling device can be used in lieu of the lamp 119.

While I have shown the circuit for switches 11c separately in Fig. 6, it is to be understood that this circuit will be combined with either of the circuits of Figs. 7 and 8, the circuits being shown separately in the drawings for ease of explanation.

It will be noted that my control switch assembly is effective as a control in both of its normal positions. In contact with the web at the processing speed, it functions to control the cutting and clamping of the web in event of breakage and may also be employed to halt the press. In the threading position, it functions to prevent the press from being operated at processing speed until all the controls are in web-contacting position. The assembly is simple in construction, easy to install, and has been found to be very reliable.

I have found that my web control means render a machine, such as a printing press, vastly more efficient. In one instance of their application, a certain press had been running five to seven days behind schedule because of delays caused by web breakage and the reconditioning afterward. Three weeks after my controls were installed, the press was sufficiently ahead of schedule as to permit of its being taken out of operation for a week for a general overhaul. This increased efficiency was due to the better control of the web and the ability to cope with the web breakage problem in a very short time.

I have found that with the controls disclosed herein, the production of a machine, such as a printing press, can be increased as much as 25% with less labor by the personnel manning the press. Costs of production have likewise been lowered. Where it was formerly the practice to maintain a complete supply of duplicate plates to take care of plate damage due to wrap-up, this has now been found unnecessary. Duplicate plates are now required only to care for the possible cracking of large plates which is inherent because of their sizes and sometimes because of a poor plate alloy. In actual practice, it has been found possible to reduce plate losses by as much as 50%.

The subject matter shown in Figs. 9 to 12 is disclosed and claimed in my Patent No. 2,492,968, granted January 3, 1950.

I claim:

1. A control assembly adapted for use in connection with a traveling web on a printing press or the like, comprising: an arm element arranged for movement between a retracted position out of contact with the web, and an actuated position, said arm element having an intermediate position in contact with the web; a shaft arranged to pivotally support said arm element for oscillatory pivotal movement between said positions; a pair of switches positioned adjacent said shaft; a first cam element on said shaft arranged to operate one of said switches only when said arm element is in said retracted position; and a second cam element on said shaft arranged to actuate the other of said switches only when said arm element is in said actuated position.

2. The control assembly of claim 1 wherein at least one of the cam elements on the shaft is rotatably adjustable thereon to vary the control of the switches relative to the position of the arm element.

3. The control assembly of claim 1 wherein means is provided to releasably lock said web-contacting arm element in its position out of contact with the web for threading of the web.

4. The control assembly of claim 1 wherein means is provided for resiliently urging said web-contacting arm element in contact with the web when in the web-contacting position and past the web-contacting position when the web breaks or tears.

5. A control assembly adapted for use in connection with a traveling web on a printing press or the like, comprising: a receptacle containing a switch; an actuating member for the switch extending outside said receptacle; a U-shaped support mounted on the receptacle with the legs of the U extending on opposite sides of said switch-actuating member; a shaft rotatably supported on said legs; a cam on said shaft arranged to rotate with the shaft and control said switch-actuating member as the shaft is rotated; a web-contacting arm on said shaft arranged for movement between a position in contact with the web and a position out of contact with the web, said arm being fixed to said shaft to rotate therewith whereby movement of said arm between said positions controls said switch, one of said legs of said U-shaped support being extended to provide a locking latch for a portion of said shaft in one of the positions of said arm; and means for yieldingly urging said shaft in a direction to engage said latch.

6. A control assembly adapted for use in connection with a traveling web on a printing press or the like, comprising: an arm element arranged for movement between a retracted position out of contact with the web, and an actuated position, said arm element having an intermediate position in contact with the web; a shaft arranged to pivotally support said arm element for oscillatory movement between said positions; a pair of switches positioned adjacent said shaft; a first cam element on said shaft arranged to operate a first one of said switches only when said arm element is in said retracted position; a second cam element on said shaft arranged to actuate the other of said switches only when said arm element is in said actuated position; and means controlled by said first one of said switches for indicating at a remote location when said arm element is in said retracted position.

7. A control assembly adapted for use in connection with a traveling web on a printing press or the like, comprising: an arm element arranged for movement between a retracted position out of contact with the web, and an actuated position, said arm element having an intermediate position in contact with the web; a shaft arranged to pivotally support said arm element for oscillatory movement between said positions; a pair of switches positioned adjacent said shaft; a first cam element on said shaft arranged to operate a first one of said switches only when said arm element is in said retracted position; a second cam element on said shaft arranged to actuate the second of said switches only when said arm element is in said actuated position; and means controlled by said second switch for severing said web.

8. A control assembly adapted for use in connection with a traveling web in a printing press or the like, comprising an arm element arranged for movement between a retracted position out of contact with the web, and an actuated position, said arm element having an intermediate position in contact with the web; a shaft arranged to pivotally support said arm element for oscillatory movement between said positions; a pair of switches positioned adjacent said shaft; a first cam element on said shaft arranged to operate one of said switches only when said arm element is in said retracted position; a second cam element on said shaft arranged to actuate the other of said switches only when said arm element is in said actuated position; drive means for said press; and means controlled by at least one of said switches for controlling said drive means.

9. A control assembly adapted for use with a web-handling machine such as a printing press or the like which is arranged to run at a relatively low speed for threading the web and at a relatively high speed for processing the web, comprising: a plurality of web control arms distributed at various points on the machine adjacent the web therein, each of said arms being arranged for movement between a position out of contact with the web as when the machine is being operated at said low speed for threading the web and a position in contact with the web as when the machine is being operated at said high speed; means to drive the machine at said high speed; and means to prevent operation of said driving means until all said web control arms are moved from their threading positions to their web-contacting positions.

10. A control assembly adapted for use with a web-handling machine such as a printing press or the like which is arranged to run at a relatively low speed for threading the web and at a relatively high speed for processing the web, comprising: a plurality of web control arms distributed at various points on the machine adjacent the web therein, each of said arms being arranged for movement between a position out of contact with the web as when the machine is being operated at said low speed for threading the web and a position in contact with the web as when the machine is being operated at said high speed; a control switch associated with each of said arms and arranged for actuation thereby as the associated arm moves between its positions; electrically controlled means to drive the machine at said high speed; and means controlled by said control switches to maintain said last-mentioned means inoperative when said arms are in the threading position.

11. A control assembly adapted for use with a web-handling machine such as a printing press or the like which is arranged to run at a relatively low speed for threading the web and a relatively high speed for processing the web, comprising: a plurality of web control arms distributed at various points on the machine adjacent the web therein, each of said arms being arranged for movement between a position out of contact with the web as when the machine is being operated at said low speed for threading the web and a position in pressed contact with the web as when the machine is being operated at said high speed for processing the web; a series of web cutting devices distributed at various points on the machine adjacent the web therein and normally maintained in non-cutting positions; electrically controlled drive means to drive the machine at the processing speed; a switch associated with each of said arms and controlled thereby in the threading position to maintain said drive means inoperative; and a second switch associated with each of said arms and controlled thereby in the high speed processing position to actuate said web cutting devices to sever the web when the web breaks or tears.

12. A control assembly for use with a web-handling machine such as a printing press or the like which is arranged to run at a relatively low speed for threading the web and a relatively high speed for processing the web, comprising: a plurality of web control arms distributed at various points on the machine adjacent the web therein, each of said arms being arranged for movement between a position out of contact with the web as when the machine is being operated at said low speed for threading the web, and a position in pressed contact with the web as when the machine is being operated at said high speed for processing the web; a series of web cutting and clamping devices distributed at various points on the machine adjacent the web therein and normally maintained in non-cutting and non-clamping position; and means controlled by each of said arms in the high speed processing position to actuate said web cutting and clamping devices to sever and clamp the web when the web breaks or tears, and means controlled by each of said arms when in the position out of contact with the web to prevent operation of said machine at high speed.

13. A control assembly for use with a web-handling machine such as a printing press or the like which is arranged to run at a relatively low speed for threading the web and a relatively high speed for processing the web, comprising: a plurality of feeler members distributed at various points on the machine adjacent the web therein, each of said feeler members being arranged for movement between a retracted position out of contact with the web, as when the machine is being operated at low speed for threading the web, and a normal operative position in contact with the web, as when the machine is being operated at said high speed for processing the web; a series of web cutting devices distributed at various points on the machine adjacent the web therein and normally maintained in non-cutting position; means controlled by each of said feelers in the high speed processing position to actuate said web cutting devices to sever the web when the web breaks or tears, and means controlled by each of said feelers in retracted position to prevent operation of said machine at high speed.

14. In a continuous web printing press having a plurality of printing roll stands; a plurality of web cutting and clamping devices, there being a device located in advance of the first printing stand and in advance of and in the rear of each succeeding printing stand; and feeler members located in the rear of each printing stand and interconnected to operate said cutting and clamping devices upon actuation of one of said feeler members.

15. A control assembly adapted for use in connection with a traveling web on a web processing machine comprising: a feeler element arranged for movement between a retracted position out of contact with the web, and an actuating position; and a pair of switches connected in electric parallel, one of said switches being located and arranged to be actuated by said feeler element in its retracted position and the other switch being located and arranged to be actuated by said feeler element in its actuating position, said feeler member being maintained between said positions by said web in normal operation.

16. A control assembly adapted for use in connection with a traveling web on a web processing machine comprising: a feeler element arranged for movement between a retracted position out of contact with the web, and an actuating position; and a pair of switches connected in electric parallel, one of said switches being located and arranged to be actuated by said feeler element in its retracted position and the other switch being located and arranged to be actuated by said feeler element in its actuating position, said feeler member being maintained between said positions by said web in normal operation, said switches being connected to stop operation of the web processing machine.

17. The method of handling a moving web in a web-processing machine, comprising the steps of: passing said moving web from a processing unit over an idler roller to rotate said roller and thereby store kinetic energy therein; severing said web at a position preceding said processing unit upon the occurrence of a break in the web; and pressing the severed "tail" of said web against said idler roller to cause the kinetic energy therein to draw said "tail" out of said processing unit and thus prevent entanglement of said "tail" in said unit.

18. The method of handling a moving web in a printing press; comprising the steps of: passing said moving web from a printing impression unit over an idler roller to rotate said roller and thereby store kinetic energy therein; severing said web at a position preceding said impression unit upon the occurrence of a break in the web; and pressing the severed "tail" of said web against said idler roller to cause the kinetic energy therein to draw said "tail" out of said impression unit and thus prevent entanglement of said "tail" in said unit.

19. In a web-handling machine having a free running idler roller following a processing assembly such as a printing roller assembly of a printing press and wherein the idler roller is normally rotated by the driven web passing thereover and is possessed of sufficient inertia to continue rotation after the web ceases to drive the roller, a control assembly comprising: means responsive to breaking of the web; and means arranged for actuation by said first-mentioned means to force the web after breaking into sufficient frictional contact with said rotating idler roller to compel the parted web to continue in travel and be drawn from said processing assembly.

20. The control assembly of claim 19 wherein said last-mentioned means includes a second roller normally spaced from the web and the idler roller, and means to displace said roller from its spaced position into contact with the web at the area of contact of the web with the idler roller.

21. The control assembly of claim 19 wherein said last-mentioned means includes an air jet arranged to discharge air on said web opposite its area of contact with the idler roller.

22. In a web-handling machine having a web guide roller following a processing assembly such as a printing roller assembly of a printing press and wherein the guide roller is normally rotated, a control assembly comprising: means responsive to breaking of the web; and means arranged for actuation by said first-mentioned means to force the web after breaking into sufficient frictional contact with said rotating guide roller to compel the parted web to continue in travel and be drawn from said processing assembly.

23. In a web-handling machine having a web guide roller following a processing assembly such as a printing roller assembly of a printing press, a control assembly comprising: drive means for rotating said web guide roller; means responsive to breakage of the web; and means arranged for actuation by said responsive means to force the web after breaking into sufficient frictional contact with said web guide roller to compel the parted web to continue in travel and be drawn from said processing assembly.

24. In a web-handling machine having a web guide roller following a processing assembly such as a printing roller assembly of a printing press, a control assembly comprising: drive means for rotating said web guide roller; means responsive to breakage of the web; a second roller normally spaced from said web and said guide roller; and means arranged for actuation by said responsive means for displacing said second roller from its spaced position into contact with the web at the area of contact of the web with the web guide roller, thereby compelling the parted web to continue in travel and be drawn from said processing assembly.

25. A control assembly adapted for use with a web processing unit such as a printing stand of a printing press, comprising: means to sever and clamp the web adjacent said stand in event of a break therein; and a bracket adjacent said stand to prevent the severed end of the web from entering the stand.

26. A control assembly adapted for use with a web processing unit such as a printing stand of a printing press, comprising: means adjacent the path of entrance of the web to the stand to sever and clamp the web against passage into the stand in event of a break therein; and means to prevent the following web portion from entering said stand.

27. A method of handling the web in a web processing machine such as a printing press in event of a break therein, comprising the steps of: halting the operation of the machine and severing and clamping the web at predetermined points in its path of travel substantially simultaneously with any break; splicing the severed sections of the web; and rethreading the machine with the spliced web.

OTHA COOKSEY.

References Cited in the file of this patent

UNITED STATES PATENTS

| Number | Name | Date |
|---|---|---|
| 1,068,573 | Darel et al. | July 29, 1913 |
| 1,245,410 | Walkup | Nov. 6, 1917 |
| 1,270,994 | Walkup | July 2, 1918 |
| 1,582,927 | Hentschell et al. | May 4, 1926 |
| 1,929,114 | Hentschell et al. | Oct. 3, 1933 |
| 2,011,505 | Smith | Aug. 13, 1935 |
| 2,074,237 | Pierce | Mar. 16, 1937 |
| 2,181,829 | Jeffrey | Nov. 28, 1939 |
| 2,192,819 | Smith | Mar. 5, 1940 |
| 2,438,365 | Hepp et al. | Mar. 23, 1948 |

FOREIGN PATENTS

| Number | Country | Date |
|---|---|---|
| 555,306 | Great Britain | Aug. 16, 1943 |